United States Patent [19]

Tu

[11] Patent Number: 6,026,765
[45] Date of Patent: *Feb. 22, 2000

[54] SQUEEZING DOOR FOR A DROPPINGS DEHYDRATING DEVICE

[76] Inventor: Chin-Hsun Tu, P.O. Box 63-247, Taichung, Taiwan

[ * ] Notice: This patent is subject to a terminal disclaimer.

[21] Appl. No.: 09/286,234

[22] Filed: Apr. 5, 1999

[51] Int. Cl.[7] .................................................. A01K 1/01
[52] U.S. Cl. ............................................................ 119/479
[58] Field of Search ................................. 119/479, 442, 119/450

[56] References Cited

U.S. PATENT DOCUMENTS

| | | | |
|---|---|---|---|
| 3,722,475 | 3/1973 | Wittern et al. | 119/51.11 |
| 3,876,341 | 4/1975 | Nesseth | 119/28 |
| 5,832,873 | 11/1998 | Tu | 119/479 |

Primary Examiner—Thomas Price
Attorney, Agent, or Firm—Alan Kamrath; Oppenheimer, Wolff & Donnelly, LLP

[57] ABSTRACT

A separating and dehydrating device includes a body with two chains reeved through two shafts on two ends of the body, a plurality of compressing boards connected between the two chains. A funnel is connected between the opening of the body and a tube which has a motor connected to a first end thereof and second end which is closed by a door device. The door device includes two parts respectively and pivotally connected to the periphery defining the opened end. Each of the parts is connected to a weight which is located to push the corresponding part to be inserted into the tube so that the droppings in the tube is compressed by the force to open the two parts.

5 Claims, 6 Drawing Sheets

6,026,765

SQUEEZING DOOR FOR A DROPPINGS DEHYDRATING DEVICE

FIELD OF THE INVENTION

The present invention relates to a squeezing device, and more particularly, to an improved squeezing door for a device for separating and dehydrating animal droppings. The door includes two parts each is connected to a weight so as to provide a larger squeezing force to remove the liquid portion from the droppings.

BACKGROUND OF THE INVENTION

The conventional device for separating and dehydrating animal droppings is invented by applicant and has been granted as U.S. Pat. No. 5,832,873, filed on Jan. 5, 1998 with the title "Device for Separating and Dehydrating Droppings". In this patent, the dehydrating device includes a cap which normally closes the opening of the tube so that when the droppings are accumulated to a certain amount and produces a force to the cap from the inside of the cap, the cap will be opened to let the droppings drop into the collecting device. The cap has a weight connected thereto so as to provide a resistant force to the droppings so that the droppings will be further compressed by the pressure against the cap. Nevertheless, the cap is pivotally connected to the upright high position of periphery of the opening of the tube so that once the cap is pivoted by the accumulated droppings, the portion of the droppings will drop from the tube. Applicant is experienced that the cap cannot provide an effective force to compress the droppings in the tube. That is to say, the liquid portion involved in the collected droppings is still more than expected.

The improved door of the present invention has a simple structure and can be easily connected to the tube. The door provides an improved door which provides a larger compressing force to the droppings so that the drawback of the conventional dehydrating device can be resolved.

SUMMARY OF THE INVENTION

In accordance with one aspect of the present invention, there is provided a separating and dehydrating device, comprising a body having a bottom with two sidewalls extending from two sides thereof. The bottom includes a meshed portion located at the first end thereof and a plain portion located at the second end of the bottom. The plain portion is located higher than the meshed portion. An opening is defined in the second end of the bottom.

Two shafts are respectively connected between the two sidewalls of the body and located on two ends of the body. Each shaft has two gears mounted to two ends thereof and two chains are respectively received through the two respective gears on the two shafts at the same side of the body. A plurality of compressing boards are connected between the two chains.

A tube is located below the second of the bottom and communicates with the interior of the tube by a funnel. The tube has an open end and a closed end which is connected with a motor which has a driving shaft rotatably extending into the tube. A door means closes the open end of the tube and comprises a first part and a second part. The first part is pivotally connected to the periphery defining the open end and a first weight is connected to the first part. The second part is pivotally connected to the periphery defining the open end and connected to a second weight.

The primary object of the present invention is to provide a door means having two parts each of which is connected to a weight so that the droppings in the tube will be compressed by the two parts till the droppings overcome the force of the door means. Therefore, the droppings will be further squeezed by the door means.

Further objects, advantages, and features of the present invention will become apparent from the following detailed description with appropriate reference to the accompanying drawings.

DETAILED DESCRIPTION OF THE PREFERRED EMBODIMENTS

Figure 1:
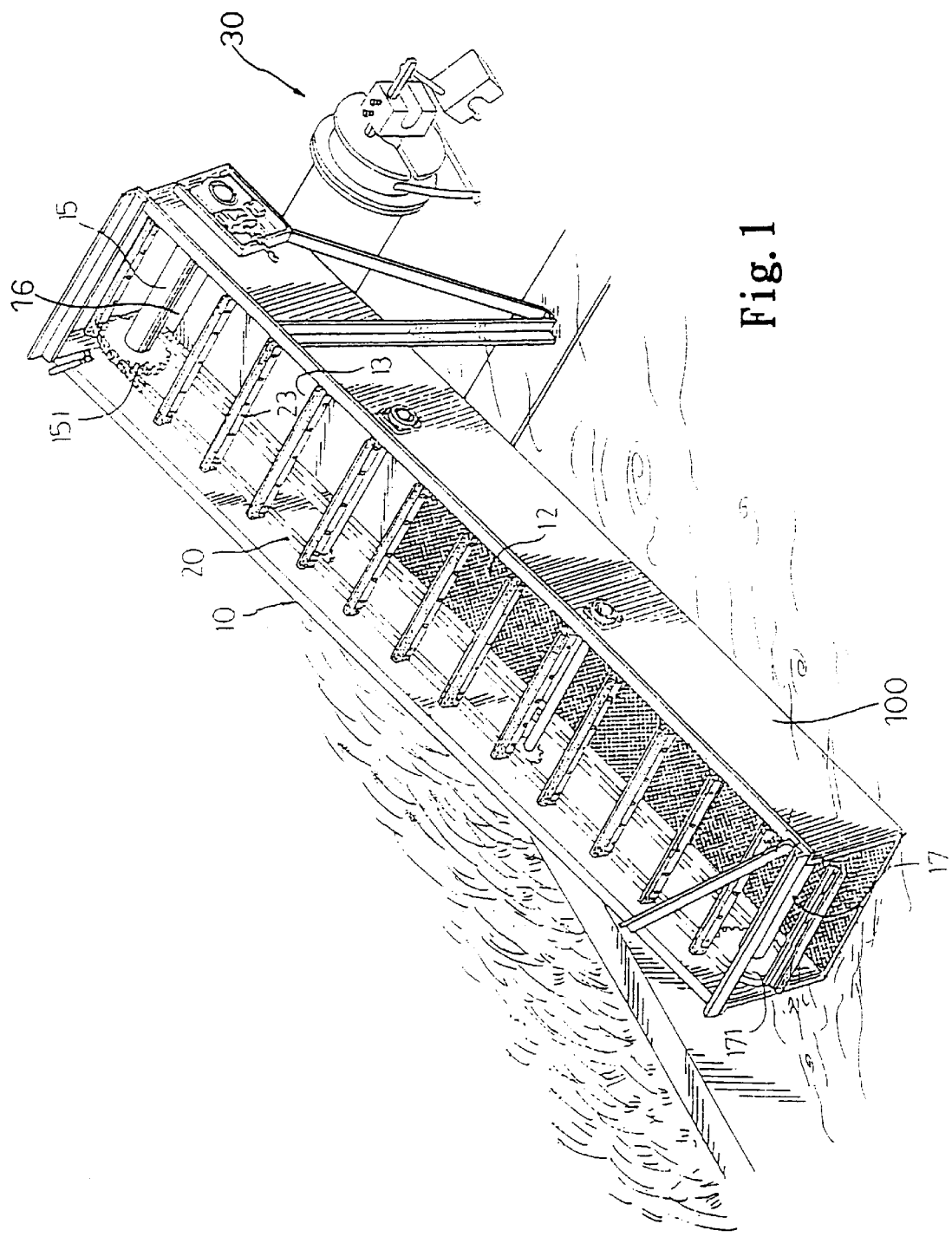
FIG. 1 is a perspective view of the device for separating and dehydrating droppings in accordance with the present invention.
Figure 2:
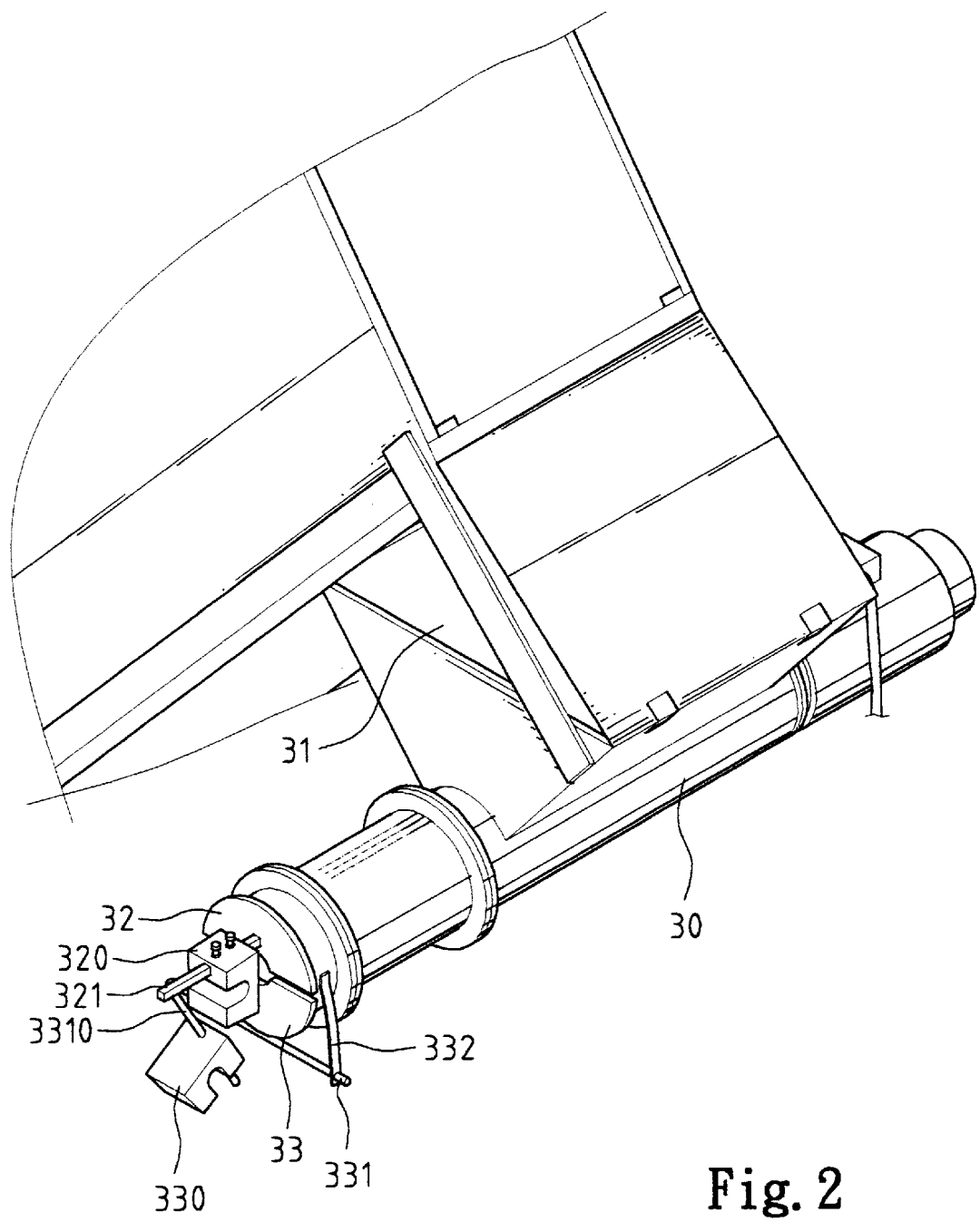
FIG. 2 is a perspective view to show the door means connected to the tube below the body of the device for separating and dehydrating droppings in accordance with the present invention.
Figure 3:
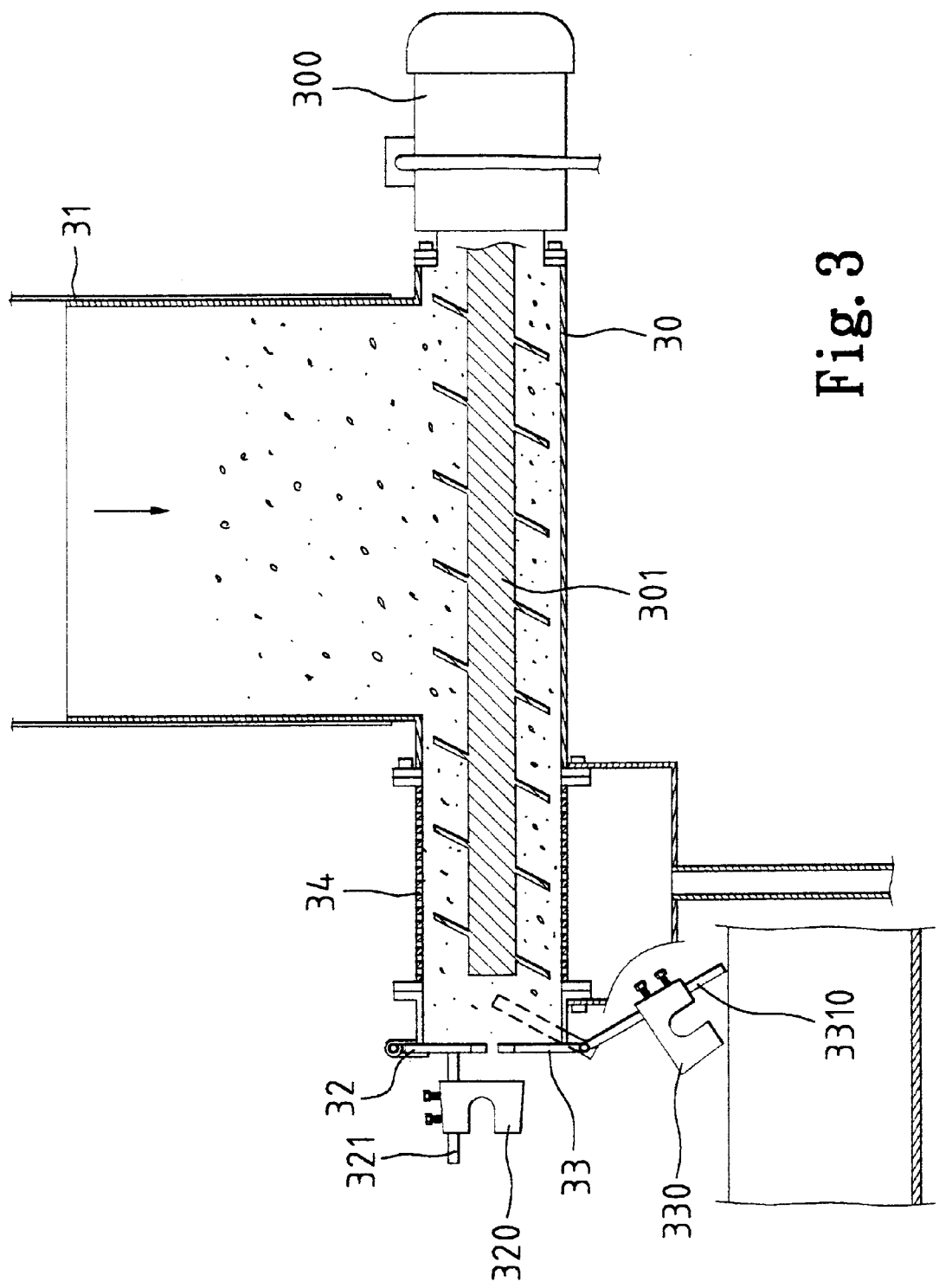
FIG. 3 is a side elevational view, partly in section, of the door means in accordance with the present invention when door means is not yet opened by the droppings in the tube.

Referring to FIGS. 1 to 3, the separating and dehydrating device comprises a body 10 having a bottom with two sidewalls 100 extending from two sides thereof. The bottom includes a meshed portion 12 located at the first end thereof and a plain portion 13 located at the second end of the bottom. The plain portion 13 is located higher than the meshed portion 12. An opening 16 is defined in the second end of the bottom.

Two shafts 15, 17 are respectively connected between the two sidewalls 100 and located on two ends of the body 10. Each of the two shafts 15, 17 has two respective gears 151, 171 mounted to two ends thereof. Two chains 20 are respectively reeved through the two respective gears 151/171 on the two shafts 15, 17 at the same side of the body 10. A plurality of compressing boards 23 are connected between the two chains 20 so that the compressing boards 23 scrape on the bottom. The body 10 has the first end of the bottom be emerged into a manure gutter and the droppings are moved by the compressing board 23 onto the bottom. The droppings are then compressed by the compressing boards 23 and the liquid portion is separated from the droppings during the travel on the meshed portion 12. The operation is the same as that disclosed in the U.S. Pat. No. 5,832,873 to applicant.

A tube 30 is located below the second end of the bottom and a funnel 31 is connected between the opening 16 and the tube 30 so that the opening 16 communicates with the interior of the tube 30 via the funnel 31. The tube 30 has an open end and a closed end which is connected with a motor 300. The motor 300 has a driving shaft 301 rotatably extending into the tube 30 so as to push the droppings dropped from the opening 16 toward the open end of the tube 30. A slotted portion 34 is defined through the wall of the tube 30 and located near the open end of the tube 30. A squeezing door means closes the open end of the tube 30 and comprises a first part 32 and a second part 33. The first part 32 and the second part 33 are respectively and pivotally connected to the periphery defining the open end.

Both of the first part 32 and the second part 33 are semi-circular boards so as to close the circular open end. The first part 32 has a rod 321 extending therefrom so that a first weight 320 is mounted to the rod 321. The second part 33 has a bar 331 connected to a lower edge thereof. Two plates 332 each have a first end connected to one of two respective ends of the bar 331, and a second end connected to the tube 30. An extension rod 3310 extends inclinedly from one of two ends of the bar 331 and the second weight 330 is mounted to the extension rod 3310.

Figure 4:
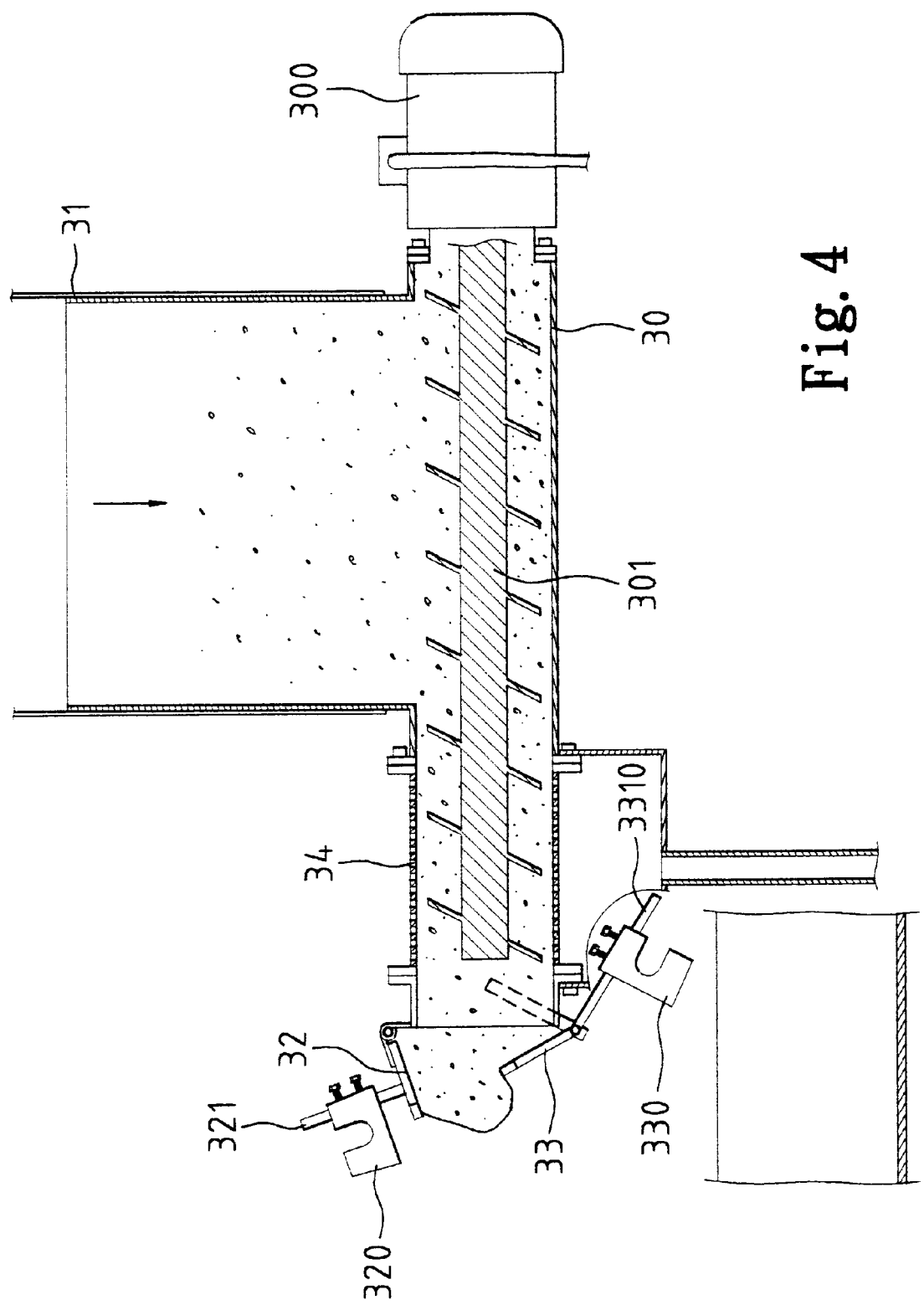
FIG. 4 a side elevational view, partly in section, of the door means in accordance with the present invention when door means is opened by the droppings in the tube.

Referring to FIG. 4, when the droppings in the tube 30 are pushed toward the open end by the driving shaft 301, the liquid portion will be separated from the droppings and drops through the slotted portion 34. The droppings are pushed against the two parts 32, 33 and the weights 320, 330 provide a resistant force to further compress the droppings until the accumulated droppings are driven to overcome the resistant force to open the two parts 32, 33 as shown. By the squeezing door means of the present invention, the droppings are dehydrated completely.

Figure 5:
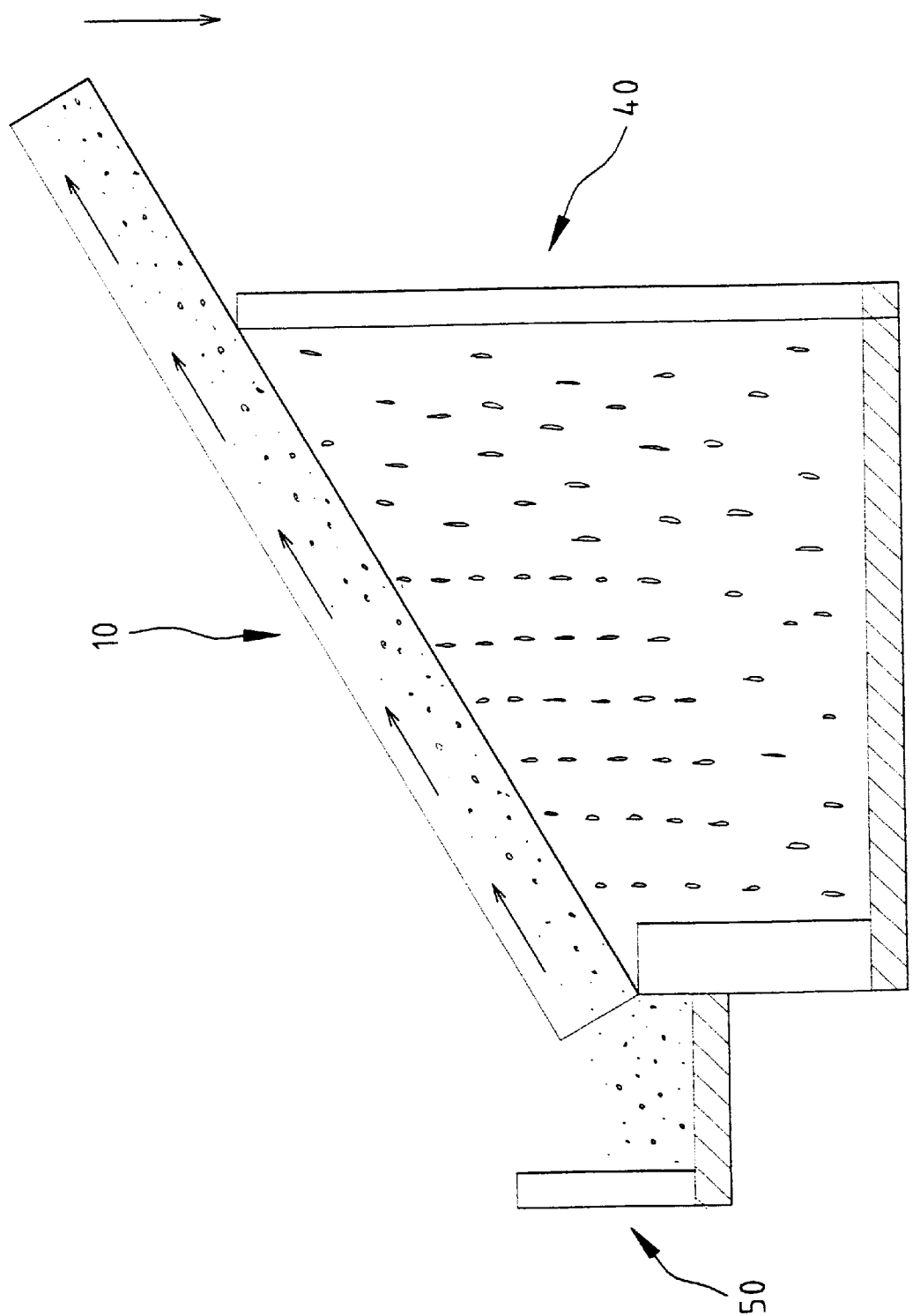
FIG. 5 is an illustrative view to show the first way to install the device in accordance with the present invention.
Figure 6:
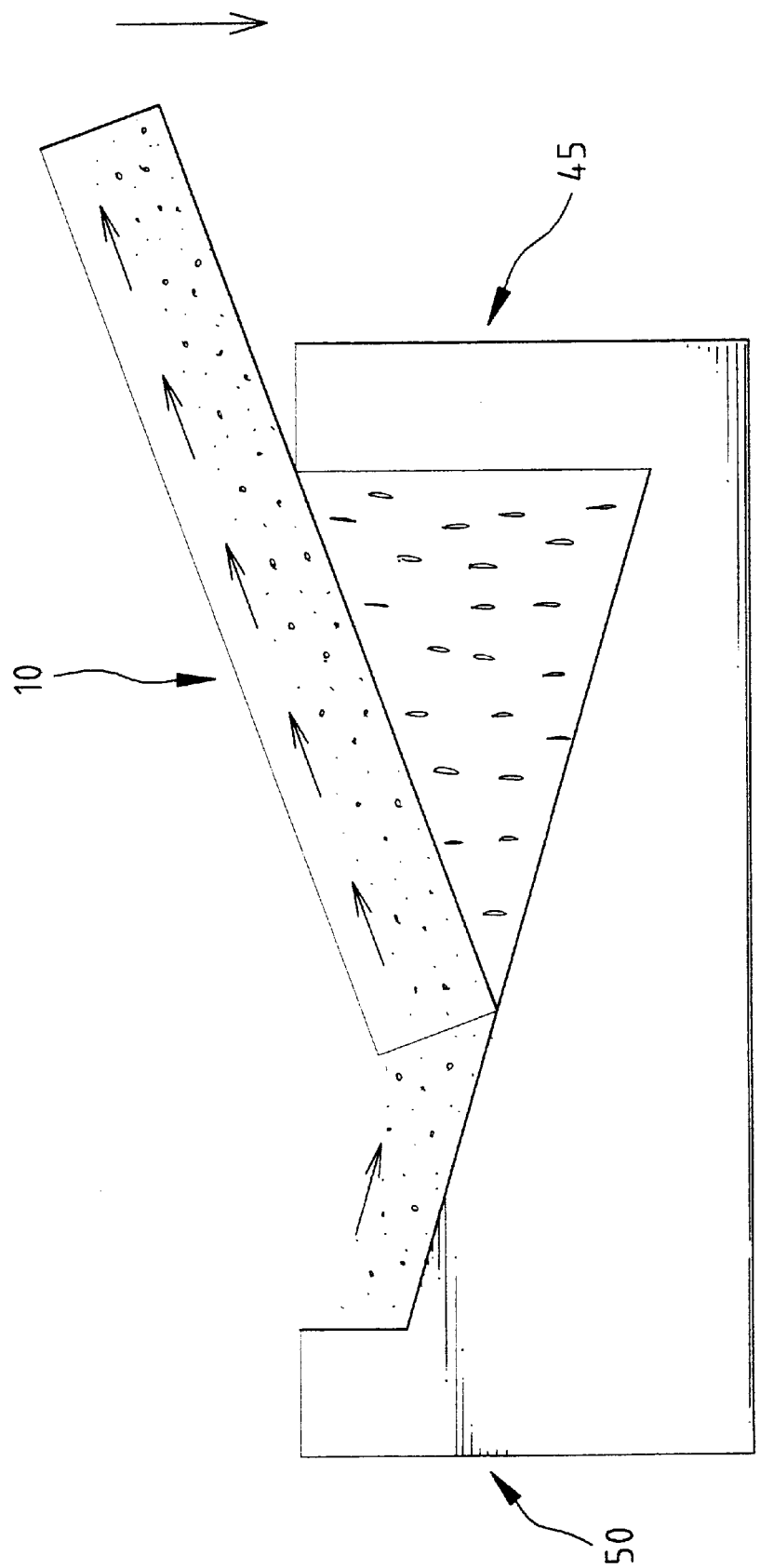
FIG. 6 is an illustrative view to show the second way to install the device in accordance with the present invention.

FIGS. 5 and 6 show two ways to install the device corresponding to the manure gutter. In FIG. 5, the body 10 is bridged across two walls of a tank 40 or the like and the cutter 50 is connected to the lower wall of the tank 40 so that when the droppings in the gutter 50 is accumulated over the lower wall of the tank 40, they will be carried onto the bottom of the body 10. FIG. 6 shows the gutter 500 has an inclined bottom and the body 10 is supported on one of two walls of the gutter 500 and the first end of the body 10 is emerged into the gutter 500.

The invention is not limited to the above embodiment but various modification thereof may be made. It will be understood by those skilled in the art that various changes in form and detail may made without departing from the scope and spirit of the present invention.

What is claimed is:

1. A separating and dehydrating device, comprising:
    a body having a bottom with two sidewalls extending from two sides thereof, said bottom including a meshed portion located at the first end thereof and a plain portion located at the second end of said bottom, said plain portion located higher than said meshed portion, an opening defined in the second end of said bottom;
    two shafts respectively connected between said two sidewalls and located on two ends of said body, each shaft having two gears mounted to two ends thereof, two chains respectively received through said two respective gears on said two shafts at the same side of said body;
    a plurality of compressing boards connected between said two chains, and
    a tube located below the second end of said bottom and a funnel connected between said opening and said tube so that said opening communicates with the interior of said tube via said funnel, said tube having an open end and a closed end which is connected with a motor, said motor having a driving shaft rotatably extending into said tube, a door means closing said open end of said tube, said door means comprising a first part and a second part, said first part pivotally connected to the periphery defining said open end and connected to a first weight, said second part pivotally connected to the periphery defining said open end and connected to a second weight.

2. The device as claimed in claim 1, wherein both of said first part and said second part are semi-circular boards.

3. The device as claimed in claim 1 further comprising a slotted portion defined through the wall of said tube and located near the open end of the tube.

4. The device as claimed in claim 1, wherein each of said first part has a rod extending therefrom so that said first weight is securely mounted to said rod.

5. The device as claimed in claim 1, wherein said second part has a bar connected to a lower edge thereof, two plates each having a first end connected to one of two respective ends of said bar, and a second end connected to said tube, an extension rod extending inclinedly from one of two ends of said bar and said second weight mounted to said extension rod.

* * * * *